United States Patent [19]

Urayama

[11] 3,971,071

[45] July 20, 1976

[54] TAPE CASSETTE WITH GUIDE MEANS FOR UNIDIRECTIONAL INSERTION AND HOLDER THEREFORE

[75] Inventor: Kiyoshi Urayama, Sendai, Japan

[73] Assignee: Sony Corporation, Tokyo, Japan

[22] Filed: Mar. 10, 1975

[21] Appl. No.: 557,069

[30] Foreign Application Priority Data

Mar. 11, 1974 Japan .......................... 49-28128[U]

[52] U.S. Cl. .............................. 360/132; 242/199; 352/78 R
[51] Int. Cl.² .................... G11B 23/08; G03B 1/04; G03B 23/02
[58] Field of Search ........................ 360/132, 93–96, 360/137; 242/55.19 A, 198, 199; 352/78 R, 78 C

[56] References Cited
UNITED STATES PATENTS

| | | | |
|---|---|---|---|
| 3,352,976 | 11/1967 | Gonmori | 360/132 |
| 3,504,135 | 3/1970 | Hammond | 360/132 |
| 3,650,378 | 3/1972 | Kakiuchi et al. | 360/132 |
| 3,672,603 | 6/1972 | Swain | 242/198 |

*Primary Examiner*—Robert S. Tupper
*Attorney, Agent, or Firm*—Lewis H. Eslinger; Alvin Sinderbrand

[57] ABSTRACT

In a tape cassette having a housing of generally rectangular configuration containing a supply of tape and including top and bottom walls which define top and bottom surfaces of the housing, a peripheral wall extending between the top and bottom walls and first and second guiding means, for example, constituted by respective grooves, extending along the peripheral wall at opposite sides of the housing for slidable engagement with complementary guiding means, for example, constituted by ribs, on respective side walls of a cassette holder into which the cassette is slidably insertable; the distances from the top and bottom surfaces of the housing to upper and lower guiding surfaces, respectively, on at least one of the first and second guiding means are made unequal, and either the distances from the upper and lower guiding surfaces of the first and second guiding means, respectively, to the top and bottom surfaces, respectively, of the housing are unequal or the distances from the lower and upper guiding surfaces of the first and second guiding means, respectively, to the bottom and top surfaces, respectively, of the housing, are unequal, with the result that the cassette is insertable into the holder in only one orientation of the cassette housing relative to the holder. In a preferred tape cassette, the housing thereof is made up of individually molded upper and lower portions which respectively include the top and bottom walls of the housing and peripheral flanges extending from the top and bottom walls and mating edgewise with each other to define the peripheral wall of the housing, and grooves which constitute the aforesaid first and second guiding means are each defined by a respective rabbet extending along the edge of the flange of at least one of the upper and lower portions of the housing so as to facilitate the molding of such housing portions.

12 Claims, 12 Drawing Figures

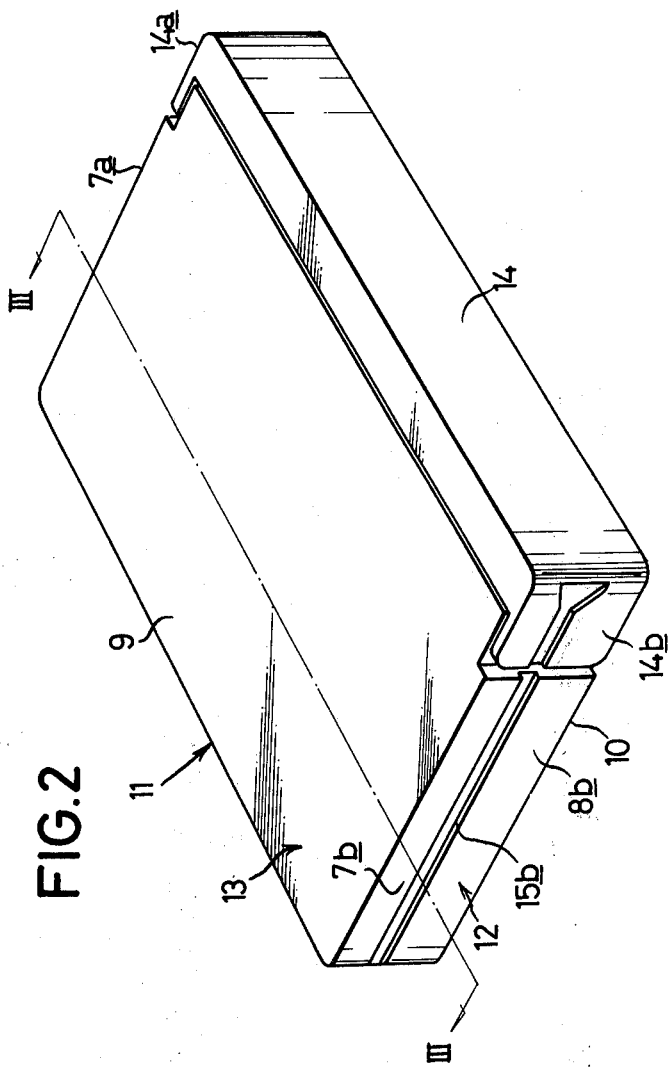

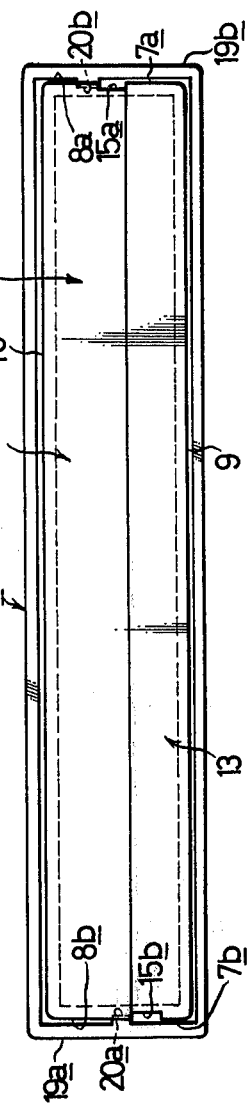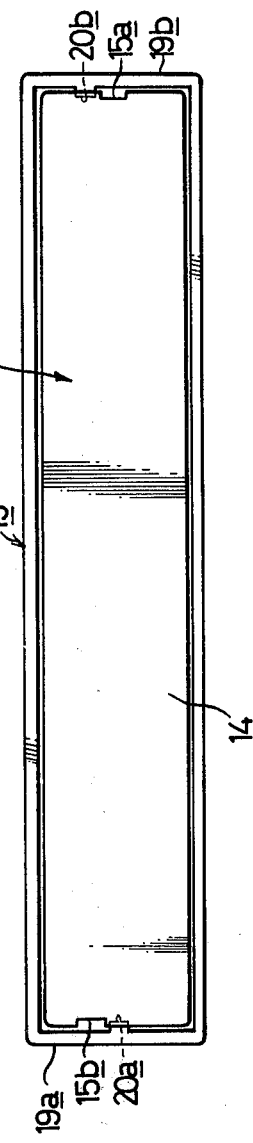

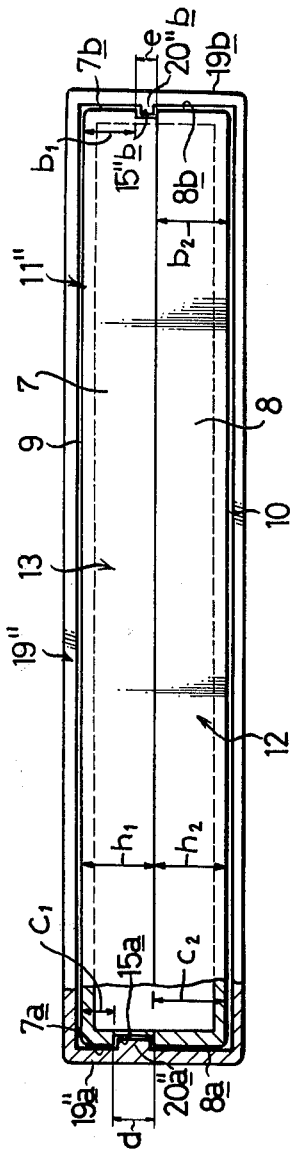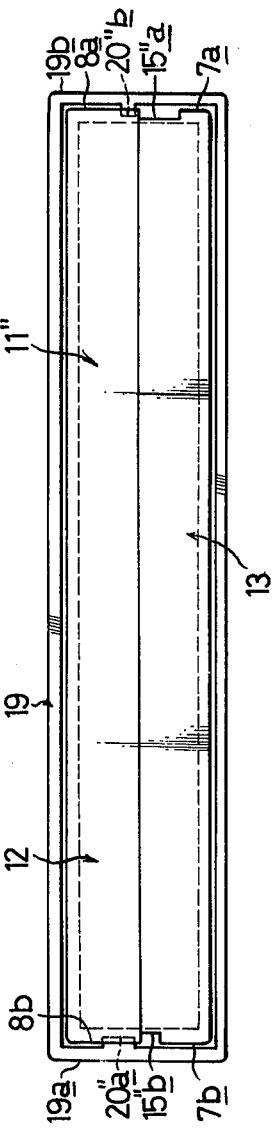

TAPE CASSETTE WITH GUIDE MEANS FOR UNIDIRECTIONAL INSERTION AND HOLDER THEREFORE

BACKGROUND OF THE INVENTION

1. Field of the Invention

This invention relates generally to tape cassettes of the type in which a supply of tape is contained in a housing for protecting the tape when the cassette is not in use, and more particularly is directed to improvements in tape cassettes of the described character for ensuring the proper positioning of the tape cassette in respect to a cassette holder or loading mechanism by which the cassette is positioned on a magnetic recording and/or reproducing apparatus.

2. Description of the Prior Art

The use of tape cassettes in magnetic recording and/or reproducing apparatus has been expanding steadily as a result of the protection afforded to the tape when the cassette is not in use and the ease with which the tape can be loaded on the apparatus for a recording or reproducing operation. Initially, tape cassettes were used in connection with magnetic recording and/or reproducing apparatus of the type having a fixed magnetic head or heads projected into the cassette housing through a relatively small window or windows in the latter for engaging the tape within the cassette housing during a recording or reproducing operation. However, more recently it has been proposed to employ tape cassettes in magnetic recording and/or reproducing apparatus of the type having one or more rotary magnetic heads, for example, as in apparatus for recording and/or reproducing video signals on a magnetic tape. In the last mentioned use of tape cassettes, it is necessary that the tape cassette be easily and accurately positioned on the apparatus in order to ensure the reliable operation of an associated tape loading device by which the tape is withdrawn from the cassette housing and wrapped about a cylindrical guide drum for scanning in oblique tracks by the rotary magnetic head or heads associated with such drum.

When the recording and reproducing of signals on the tape is effected by a rotary magnetic head or heads, as above, it is necessary to provide the cassette housing with an opening through which the tape can be withdrawn from the housing for engagement with such head or heads associated with the drum by means of the tape loading device. In an existing tape cassette of the foregoing type, for example, as disclosed in U.S. Pat. No. 3,735,939, issued May 29, 1973, and having a common assignee herewith, the cassette is provided with a lid which is normally spring biased to cover the tape extending across the opening of the cassette housing when the cassette is not in use, and which is movable to an opened position exposing the tape at the opening of the cassette housing when the cassette is disposed in an operative position on the magnetic recording and/or reproducing apparatus. U.S. Pat. No. 2,941,741 similarly discloses a tape cassette in which an opening extends along the entire length of one side of the cassette housing and a lid is provided for normally covering such opening.

In magnetic tape recording and/or reproducing apparatus having a rotary magnetic head or heads, as described above, there is usually provided a cassette loading mechanism having a holder which is adapted to receive the cassette in a conveniently elevated position and which is then movable downwardly for disposing the cassette in an operative position at which the lid of the cassette housing is opened and the tape loading mechanism of the apparatus is engageable with the tape extending across the exposed opening of the cassette housing. Usually, the holder of the cassette loading mechanism is adapted to have the cassette slidably inserted therein either in the direction parallel to the side of the cassette housing provided with the opening or in the direction perpendicular to that side of the cassette housing. Whether the cassette is slidably insertable into the holder in one or the other of the foregoing directions, it will be apparent that such insertion of the cassette must be effected with the cassette housing in only a single orientation relative to the holder if the cassette is to be properly disposed for engagement of the tape loading mechanism with the tape extending across the opening of the cassette housing when the cassette is moved to its operative position by the cassette loading mechanism. However, existing tape cassettes and the corresponding holders for receiving the same do not prevent insertion of the cassette into the holder except in a single predetermined relative orientation, that is, the cassette may be inserted in either an upside down or front to rear position in respect to its desired orientation relative to the cassette holder.

OBJECTS AND SUMMARY OF THE INVENTION

Accordingly, it is an object of this invention to provide a tape cassette of the described type which is insertable into the corresponding holder of a cassette loading mechanism in only a single predetermined orientation of the cassette housing relative to the cassette holder.

More specifically, it is an object of this invention to provide a tape cassette with guiding means thereon engageable with complementary guiding means on the holder of a cassette loading mechanism, and in which the guiding means on the cassette housing and holder are dimensioned and relatively positioned so as to permit insertion of the cassette in only a single proper orientation relative to the cassette holder.

A further object is to provide a tape cassette, as aforesaid, in which the guiding means on the cassette housing, for example, defined by grooves in opposed sides of the cassette housing, are formed so as to facilitate the manufacture of the cassette while ensuring that the cassette is insertable into the holder of a cassette loading mechanism in only a single orientation relative to the latter.

In accordance with an aspect of this invention, the peripheral wall of a generally rectangular cassette housing is provided with first and second guiding means, for example, in the form of respective grooves, extending along the peripheral wall at opposite sides, respectively, of the housing, and the distances from the top and bottom surfaces of the housing to upper and lower guiding surfaces respectively of at least one of the guiding means are made unequal, while at least the distance from the upper or lower guiding surface of the first guiding means to the top or bottom surface, respectively, of the housing is made unequal to the distance from the lower or upper guiding surface, respectively, of the second guiding means to the bottom or top surface, respectively, of the housing.

In a preferred embodiment of the invention, the cassette housing is conveniently made up of upper and lower portions which respectively include the top and bottom walls of the housing and corresponding peripheral flanges which mate edgewise with each other in the assembled cassette housing, and grooves constituting the above mentioned first and second guiding means extending along the peripheral wall at opposite sides of the housing are each defined by a respective rabbet extending along the edge of the flange of at least one of the upper and lower portions of the housing, so that such portions of the housing can be conveniently molded individually of a suitable synthetic resin.

The above, and other objects, features and advantages of the invention, will be apparent in the following detailed description of illustrative embodiments of the invention which is to be read in connection with the accompanying drawings.

BRIEF DESCRIPTION OF THE DRAWINGS

FIG. 2 is a perspective view of a tape cassette according to one embodiment of this invention for use in a video tape recording and/or reproducing apparatus;

FIGS. 6A and 6B are views similar to that of FIG. 5, but respectively showing how the guiding means provided in accordance with this invention on the cassette housing and cassette holder are effective to prevent the insertion of the cassette in either an upside down or back to front position in respect to the proper orientation of the cassette relative to the holder;

FIG. 7 is a view similar to that of FIG. 5, but illustrating a tape cassette and holder according to another embodiment of this invention; and FIGS. 8A and 8B are views similar to those of FIGS. 6A and 6B, but illustrating the cassette and holder shown on FIG. 7.

DESCRIPTION OF THE PREFERRED EMBODIMENTS

Figure 1A:
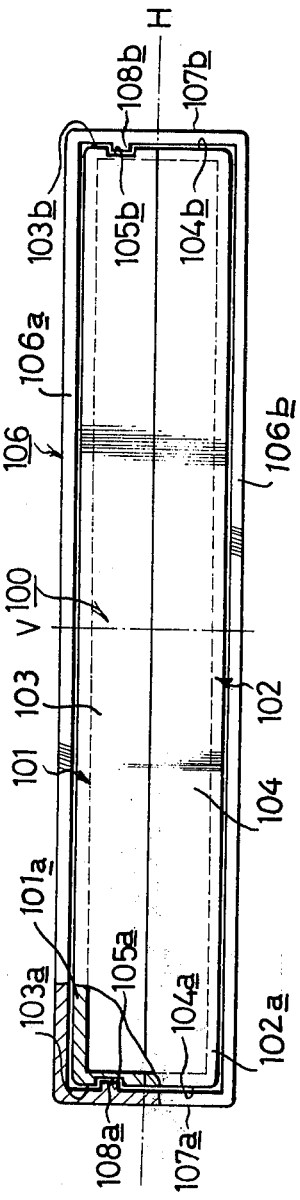
FIG. 1A is a schematic front elevational view of a tape cassette inserted in a holder therefor, and being shown partly broken away and in section to illustrate the cooperating guiding means provided on the cassette housing and holder, as suggested in the prior art.

Referring initially to FIG. 1A, it will be seen that, in a previously proposed tape cassette 100, for example, similar to the type disclosed in detail in U.S. patent application Ser. No. 403,431, now U.S. Pat. No. 3,900,170, filed Oct. 4, 1973, and having a common assignee herewith, the cassette housing is made up of upper and lower portions or halves 101 and 102 which respectively include top and bottom walls 101a and 102a and peripheral flanges 103 and 104 extending from such top and bottom walls 101a and 102a, respectively, and mating edgewise, as shown, to define a peripheral wall of the cassette housing. At the opposite ends or sides of the generally rectangular cassette housing, the respective portions 103a and 103b of the flange 103, or the respective portions 104a and 104b of the flange 104, are formed with guide grooves 105a and 105b which extend substantially parallel with the top and bottom surfaces of the cassette housing defined by the walls 101a and 102a, respectively. As shown, the guide grooves 105a and 105b are formed in the portions 103a and 103b of the same flange 103 and have equal widths and depths, and further are equally spaced from the plane H which is parallel to, and midway between the top and bottom surfaces of the cassette housing. Further, the cassette 100 is intended to be slidably inserted into a holder 106 of a cassette loading mechanism which is otherwise not illustrated on FIG. 1A. The holder 106 is shown to include top and bottom walls 106a and 106b which are held in parallel, spaced apart relation by side walls 107a and 107b to define an interior cavity or space into which the cassette 100 is slidably insertable in the direction parallel to its opposite sides having the guide grooves 105a and 105b therein.

Figure 1B:
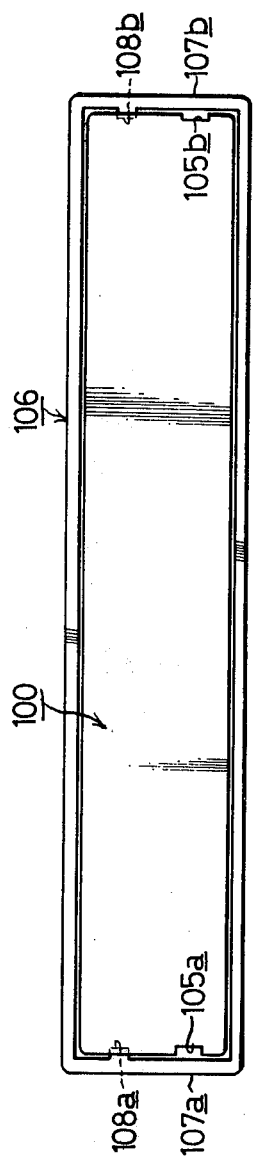
FIG. 1B is a view similar to that of FIG. 1A, but showing the cassette disposed upside down in respect to its position on FIG. 1A for illustrating the manner in which the cooperative guiding means of the cassette housing and holder prevent insertion of the cassette into the holder in such upside down position.

The cassette holder 106 is further shown to have guide ribs or ridges 108a and 108b projecting inwardly from side walls 107a and 107b, respectively, and being dimensioned and positioned for complementary engagement with the guide grooves 105a and 105b, respectively, of cassette 100 upon the insertion of the latter into holder 106 with the cassette being in its proper orientation relative to the holder, as shown on FIG. 1A. By reason of such complementary engagement of guide rib 108a in groove 105a and of guide rib 108b in groove 105b, the cassette 100 is firmly positioned within cassette holder 106, and such firm and accurate position of the cassette within the cassette holder is of considerable partical importance in connection with the reliable movement of the cassette to an operative position on a video tape recording and/or reproducing apparatus by means of the cassette loading mechanism of which holder 106 is a part. Since both guide grooves 105a and 105b are equally offset relative to the plane H in the direction toward the top surface of the cassette housing, and since the guide ribs 108a and 108b are similarly located to engage in grooves 105a and 105b when cassette 100 is inserted in holder 106 with the top surface of the cassette housing being uppermost, any attempt to insert cassette 100 into holder 106 in an upside down position, that is, with the top surface of the cassette housing being lowermost, will be thwarted or blocked by the ribs 108a and 108b which, as shown on FIG. 1B, will then be offset relative to the respective grooves 105a and 105b. However, the above described locations of the grooves 105a and 105b will not prevent the insertion of cassette 100 into holder 106 with the cassette being arranged front to back relative to its desired orientation in respect to holder 106. Upon such improper orientation of cassette 100 relative to holder 106, that is, with the cassette being arranged front to back relative to its desired or proper orientation, guide rib 108a will be engageable in guide groove 105b and guide rib 108b will be engageable with guide groove 105a, with the result that the improper back to front orientation of the cassette will not prevent insertion of the cassette into holder 106. Such improper back to front orientation of the cassette upon its insertion into holder 106 can cause considerable damage to the recording and/or reproducing apparatus when the cassette loading mechanism of which holder 106 is a part is actuated to move cassette 100 to an operative position. More particularly, in the case where the cassette has an opening at the front of the cassette housing and is intended for use in a video tape recording and/or reproducing apparatus having a tape loading mechanism adapted to extend into such opening at the front of the cassette housing when the latter is moved to its operative position by the cassette loading mechanism, the improper back to front orientation of the cassette in holder 106 would not dispose the cassette opening for receiving the tape loading mechanism in the operative position of the cassette, and serious damage to such tape loading mechanism could result.

It will further be apparent that, if the grooves 105a and 105b in portions 103a and 103b of flange 103 are spaced upwardly from the free edge of such flange, as shown on FIG. 1A, considerable difficulty is experienced in removing the upper housing portion 101 from the respective mold in the case where the housing portions 101 and 102 are molded of a suitable synthetic resin.

Figure 3:
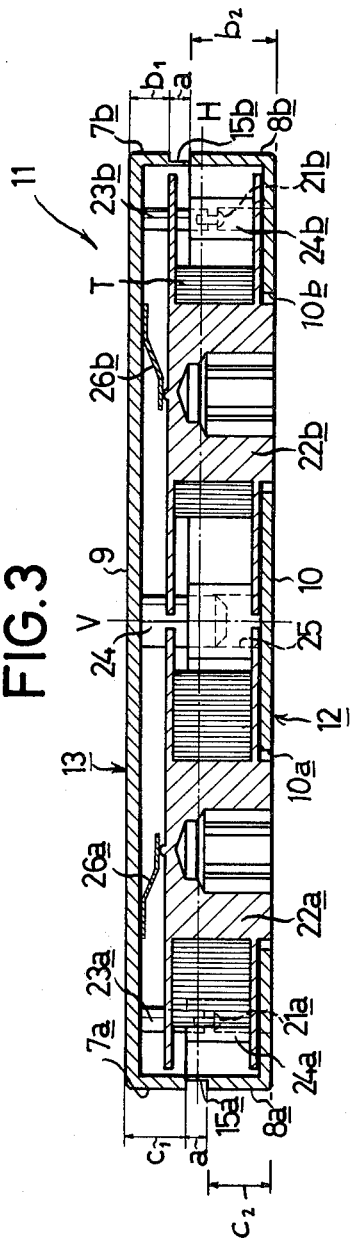
FIG. 3 is a longitudinal sectional view taken along the line III—III on FIG. 2.

Referring now to FIGS. 2 and 3, it will be seen that, in a cassette 11 embodying this invention, the generally rectangular cassette housing is composed of upper and lower portions 13 and 12 which respectively include top and bottom walls 9 and 10 peripheral flanges 7 and 8 extending from the top and bottom walls and mating edgewise to define a peripheral wall of the cassette housing. The housing portions 12 and 13 are conveniently molded individually of a suitable synthetic resin and, as shown particularly on FIG. 3, may be secured together by means of posts 23a and 23b extending integrally from the undersurface of top wall 9 and fitting into hollow bosses 24a and 24b, respectively, which project upwardly from bottom wall 10. Screws 21a and 21b extend through holes in hollow bosses 24a and 24b and are engaged in suitable tapped bores provided in posts 23a and 23b for securing housing portions 12 and 13 to each other. Further, as shown, a cylindrical projection 24 having a beveled free end edge may depend from the central portion of top wall 9 for frictional engagement in a cylindrical receptacle 25 which is similarly located and projects upwardly from bottom wall 10. The insertion of projection 24 in cylindrical receptacle 25 is facilitated by the beveled free edge of projection 24 and the frictional engagement of the latter in receptacle 25 serves to properly locate the housing portions 12 and 13 relative to each other and to temporarily hold such housing portions in assembled relation until they are secured to each other by the installation of screws 21a and 21b.

The housing of cassette 11 contains a magnetic tape T which is wound on reels 22a and 22b and has its opposite ends respectively secured to such reels (FIG. 3). The reels 22a and 22b are suitably located rotatably within the cassette housing so that downwardly opening sockets define by reels 22a and 22b will resister with corresponding holes 10a and 10b provided in bottom wall 10. Further, spring plates 26a and 26b may be mounted at the underside of top wall 9 for urging reels 22a and 22b, respectively, downwardly against bottom wall 10. Since the tape cassette 11 is intended for use in a video tape recording and/or reproducing apparatus of the type in which the tape T has to be withdrawn from the cassette housing for engagement with rotary magnetic recording and/or reproducing heads associated with a cylindrical guide drum (not shown), one long side of the generally rectangular cassette housing, more specifically, the front of the housing, has an opening O (FIG. 4) extending therealong to permit the withdrawal of the tape through such opening. In order to protect the tape T within the cassette housing when cassette 11 is not in use, such cassette is further shown to include a lid 14 suitably pivoted on the cassette housing for movement between a closed position covering the opening O, as shown on FIG. 4, and an upwardly pivoted open position (not shown) in which opening O is exposed. The lid 14 desirably has right-angled end portions 14a and 14b which, in the closed position of the lid, are contiguous and flush with the flange portions 7a and 8a and the flange portions 7b and 8b, respectively, which constitute the peripheral wall of the cassette housing at the opposite, relatively short sides of the latter.

As in the case of the previously existing tape cassette described above with reference to FIG. 1A, the peripheral wall of such housing is provided with guide grooves 15a and 15b extending along the portions of such peripheral wall defined by flange portions 7a and 8a and flange portions 7b and 8b respectively, that is, at the opposite, relatively short sides of the generally rectangular housing. However, in accordance with the present invention, such guide grooves 15a and 15b are distinctively disposed relative to each other and relative to the top and bottom surfaces of the cassette housing defined by walls 9 and 10.

Figure 5:
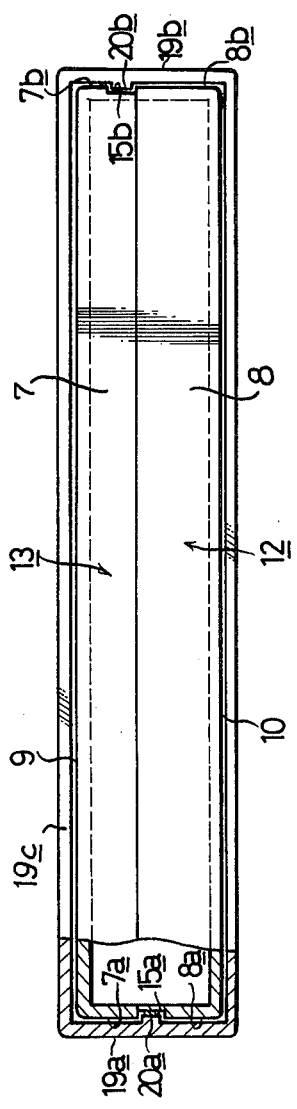
FIG. 5 is a view similar to that of FIG. 1A, but showing the cooperative relationship of the guiding means on the tape cassette of FIGS. 2 and 3 and the holder of FIG. 4 when such tape cassette is properly inserted in the holder.
Figure 5A:
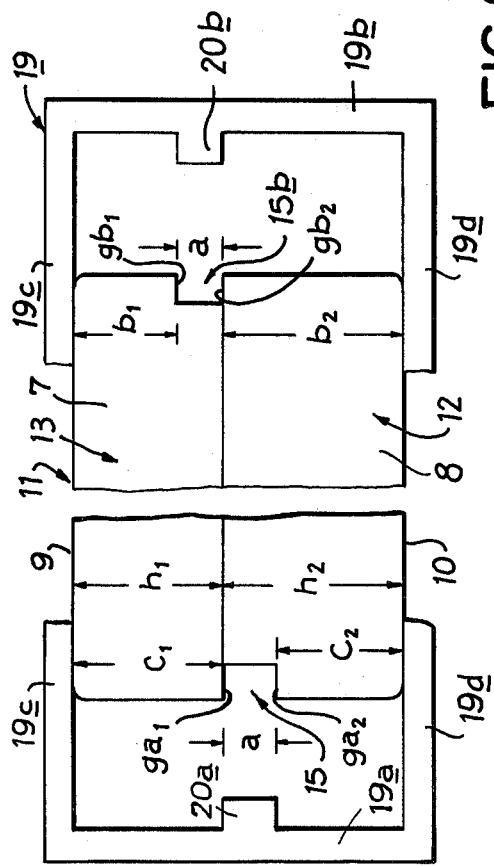
FIG. 5A is a fragmentary enlarged view corresponding to portions of FIG. 5, but in which the sides of the cassette holder have been moved laterally away from the respective sides of the cassette housing for convenience in illustrating the respective guiding means.

More specifically, as shown in FIG. 5A, guide groove 15a has upper and lower guiding surfaces $ga_1$ and $ga_2$, respectively, disposed at distances $c_1$ and $c_2$ from the top and bottom surfaces of the cassette housing defined by top and bottom walls 9 and 10, respectively. Similarly, guide groove 15b has upper and lower guiding surfaces $gb_1$ and $gb_2$, respectively, disposed at distances $b_1$ and $b_2$ from the top and bottom surfaces, respectively of the cassette housing. In accordance with the present invention, the distance $b_1$ is unequal to the distance $b_2$ and/or the distance $c_1$ is unequal to the distance $c_2$. Further, in accordance with this invention, the distance $c_1$ is made unequal to the distance $b_2$ and/or the distance $c_2$ is made unequal to the distance $b_1$.

In the case of the specific embodiment of this invention illustrated on FIGS. 3, 4, 5, 5A, 6A and 6B, both guide grooves 15a and 15b have equal widths $a$ (FIGS. 3 and 5A) and are defined by respective rabbets extending along the edges of the flange portions 8a and 7b, respectively, of the lower and upper housing portions 12 and 13. Further, as shown particularly on FIG. 5A, the flange 7 of upper housing portion 13 has a depth or height $h_1$ which is substantially smaller than the depth or height $h_2$ of flange 8 of the lower housing portion 12. Therefore, in the case of the cassette 11, the distance $b_1$ is unequal to, that is, substantially smaller than the distance $b_2$ even though the distances $c_1$ and $c_2$ may be approximately equal, and further, the distance $c_1$ is smaller than and therefore unequal to the distance $b_2$ and the distance $b_1$ is smaller than and therefore unequal to the distance $c_2$. Thus, the distances from the upper and lower guiding surfaces of guide grooves 15a and 15b to the top and bottom surfaces, respectively, of the cassette housing, as shown particularly on FIG. 5A, satisfy the inequalities which are described above as being characteristic of the present invention.

Figure 4:
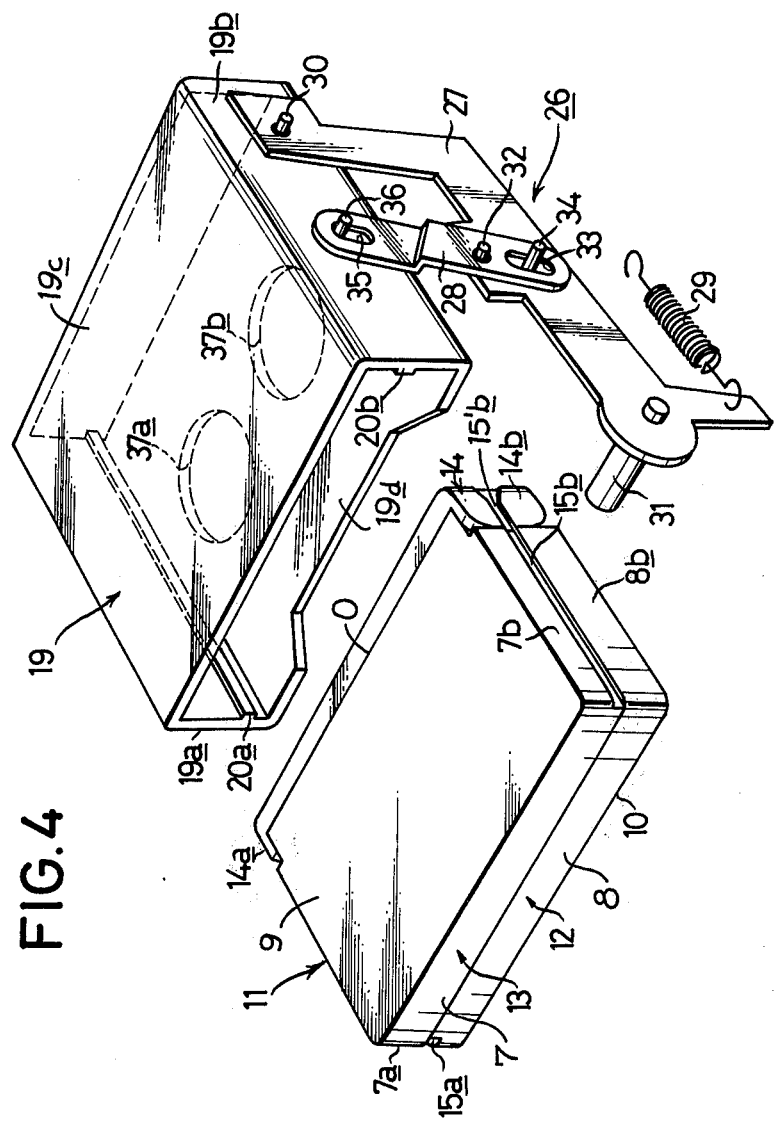
FIG. 4 is a perspective view of the tape cassette of FIGS. 2 and 3 and of a portion of a cassette loading mechanism including a cassette holder into which such tape cassette is insertable.

In the case where the lid 14 of cassette 11 has the previously described angled end portions 14a and 14b, as described above, such end portions 14a and 14b are formed with extensions of the guide grooves 15a and 15b, for example, as indicated at 15'b on FIG. 4. Such extensions of the guide grooves provided in end portions 14a and 14b of lid 14 are disposed so as to be aligned with the respective guide grooves 15a and 15b in the closed position of the lid.

As shown on FIG. 4, the described cassette 11 according to this invention may be used in a video tape recording and/or reproducing apparatus having a cassette loading mechanism that includes a cassette holder 19 supported at its opposite sides by mounting assemblies 26 for movement of the holder between an elevated cassette receiving and discharging position shown on FIG. 4 and a lowered position in which the cassette 11 contained in holder 19 is at an operative position on the recording and/or reproducing apparatus. As shown, the cassette holder 19 is generally box-like and includes side walls 19a and 19b connecting spaced apart, parallel top and bottom walls 19c and 19d to define an interior cavity or space which is open at the front and back of the holder. The holder 19 is dimensioned to have the cassette 11 slidably inserted therein through the opening at the back of holder 19 with the cassette being moved in the direction parallel to the relatively short sides of the cassette housing, that is, parallel to the guide grooves 15a and 15b during such insertion. Further, during the insertion of tape cassette 11 in holder 19, the proper orientation of the cassette requires that the relatively long side or front of the cassette housing having the opening O is foremost, and further that the top wall 9 of the cassette housing be uppermost.

As shown particularly on FIGS. 4, 5 and 5A, the side walls 19a and 19b of holder 19 are formed with inwardly directed ribs or ridges 20a and 20b, which are dimensioned and positioned for complementary engagement with the guide grooves 15a and 15b of the cassette housing when the cassette 11 is in the previously described proper orientation upon the insertion of such cassette into holder 19. More, specifically, as shown on FIG. 5A, the guide ribs 20a and 20b have the same width which is approximately equal to the width $a$ of grooves 15a and 15b, and the upper and lower surfaces of rib 20a are at distances from the top and bottom walls 19c and 19d, respectively, that are approximately equal to the previously described distances $c_1$ and $c_2$, while the upper and lower surfaces of guide rib 20b are similarly at distances from the top and bottom walls of holder 19 that are approximately equal to the distances $b_1$ and $b_2$, respectively.

Each of the mounting assemblies 26 for cassette holder 19 may be of the type disclosed in detail in U.S. Pat. application Ser. No. 520,347, filed Nov. 1, 1974, and having a common assignee herewith, and is shown to generally include a main relatively long lever 27 and an auxiliary relatively short lever 28. The main lever 27 of each mounting assembly 26 is pivotally connected, at one end, to a pivot pin 30 extending from the adjacent side wall 19a or 19b of the holder 19, while the opposite end of lever 27 is mounted on a suitably journalled horizontal axle 31, so that a spring 29 connected to each main lever 27 can urge the latter to swing upwardly about the axis defined by axle 31. The auxiliary lever 28 is pivotally mounted, intermediate its ends, on a pivot pin 32 which is fixedly carried by the respective main lever 27 at a location approximately midway between the ends of the latter. One end portion of auxiliary lever 28 has an elongated slot 33 therein which slidably receives a pin 34 fixedly carried by a suitable bracket (not shown), while the opposite end portion of auxiliary lever 28 is shown to have an elongated slot 35 which slidably receives a pivot pin 36 extending from the adjacent side wall 19a or 19b of the holder and being spaced along such side wall from the first mentioned pivot pin 30.

After cassette 11 has been properly inserted in holder 19 with the latter in its elevated cassette receiving and discharging position, the holder 19 may be pushed downwardly so as to downwardly swing each main lever 27 against the force of the respective spring 29, with each auxiliary lever 28 being effective, as fully described in the above mentioned U.S. Pat. application Ser. No. 520,347, to ensure that holder 19 and the cassette 11 therein will be horizontally positioned and will move substantially vertically at least during the final movement of the cassette to its operative position. During such final movement of cassette 11 to its operative position, reel driving shafts (not shown) of the video tape recording and/or reproducing apparatus project upwardly through holes 37a and 37b formed in the bottom wall 19d of holder 19 and through the holes 10a and 10b in bottom wall 10 of the cassette housing so as to engage in the sockets of reels 22a and 22b.

As previously described, by reason of the relative positioning of guide grooves 15a and 15b on the housing of cassette 11 and the similar relative positioning of guide ribs 20a and 20b in holder 19, such guide ribs 20a and 20b are engageable slidably in guide grooves 15a and 15b, respectively, to permit insertion of the cassette into holder 19 only when such insertion occurs with cassette 11 in its proper orientation, that is, with its top wall 9 uppermost and with the opening 0 and lid 14 foremost, so that, when fully inserted, openings 10a and 10b in bottom wall 10 of the cassette housing will register with openings 37a and 37b in the base plate or bottom wall 19d of the holder. However, if an attempt is made to insert the cassette 11 in holder 19 with the cassette disposed upside down in respect to its proper orientation, that is, with its top wall 9 facing downwardly, as shown on FIG. 6A, guide ribs 20a and 20b will be offset relative to the adjacent guide grooves 15b and 15a, and thus will block the insertion of the cassette into the holder. Further, as shown on FIG. 6B, if an attempt is made to insert cassette 11 in holder 19 with the cassette arranged front to back in respect to the proper orientation, that is, with the lid 14 in a trailing position in relation to the direction of insertion, then guide ribs 20a and 20b within the holder will again be offset relative to the adjacent guide grooves 15b and 15a of the cassette so as to block such insertion of cassette 11 into holder 19. Accordingly, the improper orientation of tape cassette 11 according to this invention is positively prevented so as to ensure that, when a cassette is inserted in holder 19 and moved by the cassette loading mechanism to an operative position on the video tape recording and/or reproducing apparatus, such cassette will be properly disposed at the operative position for permitting the required functioning of the tape loading mechanism or other devices of the recording and/or reproducing apparatus.

It will further be noted that, since guide grooves $15a$ and $15b$ of the cassette 11 embodying this invention are defined by respective rabbets extending along the free edges of flange portions $8a$ and $7b$, respectively, of the lower and upper housing portions 12 and 13, such housing portions can be conveniently molded of a synthetic resin without encountering any difficulty in removing such housing portions from the respective molds, as distinguished from the difficulty that is inherent in the case of the cassette 100 of FIG. 1A, in which the grooves $105a$ and $105b$ are formed in flange 103 at a distance from the edge of the latter. Further, since the guide means on the cassette 11 are defined by grooves $15a$ and $15b$, rather than by projecting ribs, such guide means do not interfere with the stable arrangement of a series of the cassettes standing on end with the top and bottom walls 9 and 10 of adjacent cassettes in abutting relation. The foregoing is to be contrasted with the problems encountered in similarly arranging or stacking a series of cassettes having guides on their end surfaces in the form of projecting ribs, for example, as in U.S. Pat. No. 3,547,446, in which the projecting guide ribs on the cassette housing prevent the latter from standing upright on end.

In the above described cassette 11 embodying this invention, the guide grooves $15a$ and $15b$ have been formed or defined by respective rabbets extending along flange portions $8a$ and $7b$ of housing portions 12 and 13 and have equal widths $a$, and the necessary inequalities in the distances $b_1, b_2, c_1$ and $c_2$ have been achieved by providing the flange 7 with a height or depth $h_1$ that is less than the height or depth $h_2$ of the flange 8, as previously described in detail. However, as shown particularly on FIG. 7, the previously mentioned inequalities can be attained in a cassette $11''$ according to this invention in which the guide grooves $15''a$ and $15''b$ have different widths $d$ and $e$, respectively, and are defined by respective rabbets formed along the edges of portions $7a$ and $7b$, respectively, of the same flange 7. In the case of the cassette $11''$, the flanges 7 and 8 of its housing portions 13 and 12, respectively, may have the same heights or depths, as indicated at $h_1$ and $h_2$ on FIG, 7. Of course, when the cassette $11''$ has its guide grooves $15''a$ and $15''b$ dimensioned and disposed as described above, the corresponding guide ribs or ridges $20''a$ and $20''b$ extending inwardly from the side walls $19a$ and $19b$ of the respective cassette holder $19''$ are similarly dimensioned and located.

Figure 8B:
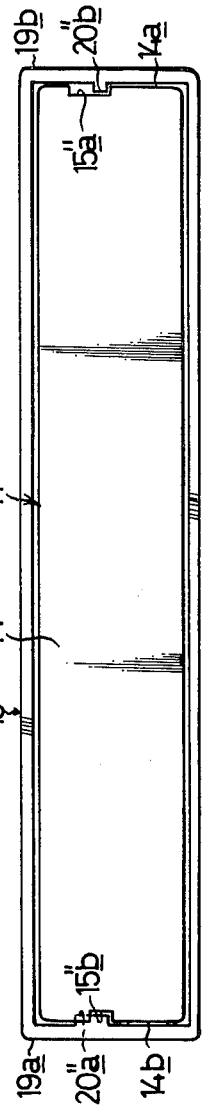

It will be seen from FIG. 8 that, in the cassette $11''$, the distance $c_1$ is unequal to the distance $c_2$ while the distance $b_1$ is also unequal to the distance $b_2$, and further that the distance $c_1$ is unequal to the distance $b_2$ and the diatance $c_2$ is unequal to the distance $b_1$. Accordingly, the inequalities in such distances described above for achieving the objects of this invention are also present in the cassette $11'''$.

Accordingly, when cassette $11''$ is inserted into holder $19''$ in its proper orientation, that is, with top wall 9 uppermost and lid 14 covering the opening of the cassette housing at the leading or foremost edge of the cassette housing, guide ribs $20''a$ and $20''b$ are slidably received in the respective guide grooves $15''a$ and $15''b$ so as to accurately position cassette $11''$ within holder $19''$. However, if an attempt is made to insert cassette $11''$ into holder $19''$ with the cassette being upside down in respect to its proper orientation, as shown on FIG. 8A, the guide ribs $20''a$ and $20''b$ are offset in respect to the adjacent guide grooves $15''b$ and $15''a$, respectively, so as to block such insertion. A similar result is achieved when an attempt is made to insert cassette $11''$ into holder $19''$ with the cassette arranged front to back in respect to its proper orientation, that is, with the lid 14 at the trailing side of the cassette considered in the direction of insertion, as shown of FIG. 8B.

It will be apparent from the above that tape cassettes according to this invention positively prevent the insertion thereof into a respective cassette holder in anything other than the proper orientation of the cassette, so as to avoid any damage to the associated apparatus even when the latter is operated by an inexperienced or careless person.

Although tape cassettes according to this invention have been specifically described for use in a video tape recording and/or reproducing apparatus, it will be apparent that the features of this invention may be similarly applied to tape cassettes intended for other uses, for example, for use in audio tape recording and/or reproducing apparatus. Further, although it is preferred that the guide means on the cassette housing be constituted by guide grooves or recesses so as not to interfere with the standing on end of such cassettes, it will be apparent that such guide grooves, as at $15a$ and $15b$, may be replaced by similarly located and dimensioned guide ribs or ridges, in which case, the associated guide ribs $20a$ and $20b$ of the cassette holder are replaced by guide grooves for slidably receiving the guide ridges on the cassette housing.

Although specific embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention as defined in the appended claims.

What is claimed is:

1. A tape cassette comprising a housing of generally rectangular configuration containing a supply of tape; said housing including top and bottom walls defining top and bottom surfaces of the housing, a peripheral wall extending between said top and bottom walls, and first and second guiding means extending along said peripheral wall at opposite sides, respectively, of said housing, each of said first and second guiding means having upper and lower guiding surfaces which are substantially parallel with, and at predetermined first and second distances from said top and bottom surfaces, respectively, of the housing, said first and second distances from said top and bottom surfaces of the housing to said upper and lower guiding surfaces, respectively, of at least one of said guiding means being unequal, and at least one of said first and second distances for said first guiding means being unequal to the other of said first and second distances for said second guiding means.

2. A tape cassette according to claim 1; in which said first and second guiding means are constituted by respective grooves in said peripheral wall at said opposite sides of the housing.

3. A tape cassette according to claim 1; in which said housing has an opening in said peripheral wall between said opposite sides of the housing and through which the tape can be withdrawn from the housing; and further comprising a lid pivoted on said housing for movement between a closed position covering said opening and an opened position exposing said opening, said lid having end portions which, in said closed position, are contiguous to said opposite sides of the housing, and said end portions of the lid having guiding means extensions which, in said closed position, are aligned with said first and second guiding means, respectively.

4. A tape cassette according to claim 2; in which said housing includes an upper portion made up of said top wall and peripheral flange depending therefrom, and a lower portion made up of said bottom wall and a peripheral flange extending from the latter and mating edgewise with said flange of the upper portion to define therewith said peripheral wall of the housing; and in which each of said grooves constituting the first and second guiding means is defined by a respective rabbet extending along the edge of the flange of at least one of said upper and lower portions of the housing, the outer surfaces of both of said peripheral flanges extending outwardly beyond the outwardly facing surface of said respective rabbet.

5. A tape cassette according to claim 4; in which the rabbets defining the grooves constituting said first and second guiding means have different widths and are formed along the edge of the flange of only one of said upper and lower portions of the housing.

6. A tape cassette according to claim 4; in which each of said upper and lower portions of the housing is of integral, one-piece construction.

7. A tape cassette according to claim 6; in which each of said upper and lower portions of the housing is a molded structure of a synthetic resin.

8. A tape cassette according to claim 4; in which said rabbet defining the groove constituting said first guiding means and said rabbet defining the groove constituting said second guiding means are formed along the edges of said flanges of said upper and lower portions, respectively, of the housing.

9. A tape cassette according to claim 8; in which said flanges of the upper and lower portions of the housing are of unequal depths.

10. A tape cassette according to claim 9; in which the rabbets respectively defining the grooves constituting said first and second guiding means have the same widths.

11. The combination of a tape cassette comprising a housing of generally rectangular configuration containing a supply of tape, said housing including top and bottom walls defining top and bottom surfaces of the housing, a peripheral wall extending between said top and bottom walls, and first and second guiding means extending along said peripheral wall at opposite sides, respectively, of said housing, each of said first and second guiding means having upper and lower guiding surfaces which are substantially parallel with, and at predetermined first and second distances from said top and bottom surfaces, respectively, of the housing, said first and second distances from said top and bottom surfaces of the housing to said upper and lower guiding surfaces, respectively, of at least one of said guiding means being unequal, and at least one of said first and second distances for said first guiding means being unequal to the other of said first and second distances for said second guiding means; and a cassette holder including a base plate defining a support surface over which said cassette housing is slidable into the cassette holder, spaced side walls extending upwardly from said base plate and being engageable with said opposite sides of the housing during the slidable insertion of the housing into the holder, means extending from said side walls and defining a retaining surface above said base plate which is slidably engageable with the cassette housing for holding the latter against said support surface during said insertion of the housing into said holder, and third and fourth guiding means extending along said spaced side walls, respectively, of the holder and being dimensioned and positioned for complementary engagement with said first and second guiding means, respectively, on the cassette housing upon said insertion of the latter into said holder in only one orientation of said housing relative to said holder.

12. The combination according to claim 11; in which said first and second guiding means are constituted by respective grooves in said peripheral wall of the housing at said opposite sides of the latter, and said third and fourth guiding means are constituted by respective ribs directed inwardly from said side walls, respectively, of the holder.

* * * * *